United States Patent Office 2,987,448
Patented June 6, 1961

2,987,448
RECOVERY OF GALACTURONIC ACID
Kenneth J. Goering, Bozeman, Mont., assignor to Oil Seed Products, Inc., Lethbridge, Alberta, Canada, a corporation of Montana
No Drawing. Filed Dec. 11, 1959, Ser. No. 858,869
11 Claims. (Cl. 195—2)

This invention relates to galacturonic acid and more particularly to a process for the recovery of galacturonic acid.

Galacturonic acid is a sugar acid which has many potential uses. It can be used as a starting material for the synthesis of Vitamin C and as an intermediate in the production of D-altronic acid from which ribose can be produced. Other uses are taught in United States Patents 2,338,534; 2,366,742; and 2,692,845 and in still others.

There have ben numerous atempts to find a cheap method of preparing galacturonic acid, divided generally between two distinct approaches; the first being hydrolysis of commercial pectin or crude materials containing pectin and the second route involving synthesis of galacturonic acid from galactose. None of these efforts has been sufficiently successful to yield a low-priced product, as evidenced by the present price of this material.

Free galacturonic acid has been reported in trace amounts in apple seeds, in ripe peaches, in cider, and in ripe pears, the largest concentration reported being about 0.035% in ripe pears. No practical method of recovering galacturonic acid from such natural products has been devised, insofar as I am aware.

In processing seeds of the mustard family Cruciferae and more especially seeds of the species *brassica*, such as mustard seed (particularly yellow mustard and brown mustard), rape seed, or the species *Cochlearia* such as horseradish, with a view to producing a proteinaceous material suitable for an animal feed, I have devised a process which yields as a by-product a liquid from which galacturonic acid may be obtained economically and relatively directly.

Briefly the seed treatment which yields the desired by-product liquid from which galacturonic acid may be recovered includes the following steps:

(1) Separation of the vegetable oil from the seed by any suitable method (solvent extraction, expressing or other methods not using heating);

(2) Hydrolysis of the glucosides present in the oil-free seed by action of enzymes originally present in the seed, or added to the seed;

(3) Distillation of the hydrolyzed mixture, at temperatures in the range 90–100° C., and preferably with agitation;

(4) Separation of the liquids from the mixtures of the liquids and solids in the still after Step 3;

(5) Inoculation of the separated liquids with a yeast culture;

(6) Fermentation of the inoculated liquids to produce a mixture of liquid and solid products;

(7) Separation of the liquid from the solids present in the fermenated mixture; and (8) Recovery of galacturonic acid from the liquid.

Drying of the solids separated in Steps 4 and 7 yields a dried protein concentrate suitable as an animal feed.

In the process of the present invention it has been found that if the yeast fermentation mentioned above as Step 6 is properly conducted, galacturonic acid may be readily recovered from the liquid remaining after separation of solids present, at a cost which on the basis of the over-all process compares quite favorably with prior art processes involving either the hydrolysis of pectin materials or a synthesis from galactose.

In the following examples the invention will be illustrated by describing the treatment of mustard seed as a preferred example of the practice of my invention. It should be understood that the invention is applicable to other seeds of the family Cruciferae such as those of the species *brassica*, including mustard seed and rape seed and seeds of the species *raphanus* including radish seed, and seeds of the species *tropaeolum*, including particularly nasturtium seeds, each of which has been found to be amenable to the treatment described in this application, for the recovery of galacturonic acid therefrom in an economical manner.

EXAMPLE I

Dry clean mustard seed (oriental yellow) is flaked by unheated corrugated rollers to facilitate recovery of the vegetable oil therefrom. This may be effected by expressing the oil from the flaked seed, or by extracting the vegetable oil by means of any suitable solvent such as hexane. Where a solvent is used it is recovered and recycled. The vegetable oil recovery forms no part of the present invention and is well known in the art.

Thereafter the solid residual mustard seed meal was charged into a vessel wherein it was mixed with about six times its weight of tap water, warmed to 50° C. and agitated gently for one hour in a closed system with the vessel connected to a condenser. By this treatment the enzyme myrosin acts on the glucoside sinigrin in the mustard seed meal and effects hydrolysis of the sinigrin and release of a volatile oil, allyl isothiocyanate. The hydrolysis is preferably effected at 50° C. but may be carried out at temperatures in the range of 40° C. to about 55° C. and must avoid temperatures sufficient to destroy the enzyme activity of myrosin. Due to the buffering action of the mustard seed, the treatment described will produce a pH of between 5.1 and 5.5 which is optimum for the action of the myrosin. Meal to water ratios of betwen 1:6 and 1:8 have been found suitable for this step. Too little water unduly prolongs the time required for hydrolysis while too much water is undesirable as it increases the cost of heating in the distillation which follows.

After the glucoside had ben hydrolyzed (usually in from 45–70 minutes) the vessel and its contents were heated rapidly to a temperature close to the boiling point of the liquid, e.g. 90–100° C. As soon as the boiling point was reached, live steam was injected into the vessel and agitation and steam distillation were continued to effect removal by distillation from the vessel of substantially all of the volatile oil (allyl isothiocyanate) released during the hydrolysis. Usually between about 10 minutes and 30 minutes at the boiling point is sufficient to accomplish the removal of the volatile oil from the mixture of liquid and solid in the vessel.

After cooling slightly to about 80° C., the mixture was screened through a 60 mesh (Tyler Standard) screen. The solids retained on the screen were washed with a small amount of water to remove any adherent liquid and were then dried in an oven. The screen liquor and wash liquid were combined and were mixed with sufficient tap water to make up a volume sufficient to provide about six parts by weight of liquid for each part of seed to be treated. The reconstituted liquid was mixed with fresh mustard seed from which the vegetable oil had been expressed and the enzyme reaction and steam distillation were repeated. During screening, the liquid cools sufficiently to provide a recycle liquid having a temperature of from 45° C. to 50° C. after the make-up addition of tap water.

When operating in the manner described, it was found that after the process was repeated several times the screen liquid becomes quite thick and slimy.

Analysis of this thick, slimy liquid revealed that it contained about 8 to 10% of free amino acids and from about 20 to 23% of carbohydrate principally in the form of two fermentable sugars: glucose and sucrose, in the ratio of about 3:5 and minor amounts of some tri- and tetra-saccharides which also appear to be fermentable. In addition, the liquid contains galacturonic acid in significant amounts.

After operating in the manner described above for six cycles, a screen liquid of the composition indicated was obtained. This liquid was dumped into a tank and inoculated with baker's yeast. The mixture was aerated at about 30° C. for from between 4 and 6 hours, during which time the yeast multiply and utilize both the available sugars and amino-acids but they do not appear to affect the free galacturonic acid in the liquid. In some instances the addition of small amounts of urea has been found to be helpful to increase yeast growth and to completely remove the carbohydrate. This varies with the batch and is controlled by testing the fermentation liquor from time to time to check that the carbohydrate (sugars) have been completely used up in the fermentation. Any excess urea added for the stated purpose may be removed by addition of urease.

After separating the fermented mixture into a liquid and solid, the galacturonic acid is recovered from the liquid by any suitable method. Three such methods which may be used are described below, but those skilled in the art will recognize that other methods may be applied to recover the free galacturonic acid from the liquid.

Method A

The yeast fermentation liquor is centrifuged to separate the yeast cells and other solid matter from the liquid containing free galacturonic acid. The liquid so recovered is boiled to effect precipitation of any residual protein which is then separated from the liquid by filtration. The filtrate is evaporated under a vacuum to dryness. The dry residue is galacturonic acid of at least 90% purity. Using this method a yield of 1.6% of galacturonic acid of 90% purity was obtained from 100 ml. of the original liquid.

Method B

In a second method the fermentation mixture is centrifuged to separate the yeast solids from the liquid. The recovered liquid contains about 1.5% free galacturonic acid which is converted to sodium strontium galacturonate and recovered from the liquid by crystallization.

Thus one liter of liquid which had been produced as the result of recycling the liquid in the meal treating process described above for 6 cycles was allowed to ferment by yeast for six hours. At the end of this time the mixture was centrifuged and the liquid which separated was digested with 3.84 g. of strontium carbonate at 70° C. After the reaction was complete, 2.21 g. of sodium bicarbonate was added and the solution was heated to boiling. The resulting solution was filtered or centrifuged while hot in order to remove any yeast protein or other solids which may have been carried into the system in the liquid previously obtained by centrifuging the fermented mixture. The hot liquid is then reduced in volume by vacuum distillation at a temperature not to exceed 50° C. to one-fourth of its original volume (about 250 ml.) and then cooled to about 4° C. It was then seeded with a crystal of sodium strontium galacturonate.

After standing overnight a crop of crystals was obtained which on careful drying weighted 15.7 grams, representing a 61.5% recovery. The mother liquor containing the balance of 5.8 g. of galacturonic acid was added to the liquid separated after fermentation and the process was repeated with the resulting mixture, a liquid now even richer than 1.5% in galacturonic acid.

Method C

A solution containing about 1.5% of galacturonic acid was obtained as the liquid separated after centrifuging the fermented mixture as in the previous methods. The so- recovered liquid was boiled and then filtered hot. The solid residue was discarded.

The filtrate was cooled to 30° C. and passed through an ion exchange column of Amberlite IR4B resin on chloride ion cycle. The column was washed with distilled water and thereafter the galacturonic acid was eluted with about 200 ml. 0.1 N aqueous HCl whereby 95% of the galacturonic acid was eluted from the resin. The resulting material was very pure and when concentrated to about 5 ml. by heating under reduced pressure, a heavy syrup was obtained which on cooling to about 4° C. and seeding with a few crystals of galacturonic acid, yielded about 64% of the galacturonic acid present in the form of solid crystals. The solids were separated by filtration. The liquid was recycled to another solution of galacturonic acid eluted from the ion exchange column and concentrated, cooled and seeded as before.

It will be seen that a method has been provided for recovering galacturonic acid which does not involve either the expensive hydrolysis of pectin or pectin containing materials or the tedious synthesis of galacturonic acid from galactose and which instead operates with relatively abundant and inexpensive raw materials.

Having now described the invention in accordance with the Patent Statutes, what is claimed as new is defined in the following claims:

1. A process for recovering galacturonic acid from the seeds of Cruciferae which comprises: separating the vegetable oil from the seed; hydrolyzing the glucosides present in the oil-free seed; steam distilling the hydrolyzed mixture; separating the liquids from the residue remaining after distillation; inoculating the separated liquids with a yeast culture of baker's yeast; fermenting the inoculated liquids; separating the liquids from the solids in the fermented mixture; and recovering the galacturonic acid from the separated liquid.

2. A process for recovering galacturonic acid from the seeds of plants of the species *brassica* which comprises: extracting the vegetable oil from the seed; hydrolyzing the glucosides present in the oil-free seed; steam distilling the hydrolyzed mixture; separating the liquids from the residue remaining after distillation; inoculating the separated liquids with a yeast culture of baker's yeast fermenting the inoculated liquids; separating the liquids from the solids in the fermented mixture; and recovering the galacturonic acid from the separated liquid.

3. A process for recovering galacturonic acid from the seeds of Cruciferae which comprises: separating the vegetable oil from the seed; hydrolyzing the glucosides present in the oil-free seed by action of enzymes originally present in the seed; steam distilling the hydrolyzed mixture; separation of the liquids from the residue remaining after distillation; inoculating the separated liquids with a yeast culture of baker's yeast; fermenting the inoculated liquids; separating the liquids from the solids in the fermented mixture and recovering the galacturonic acid from the separated liquid.

4. A process for recovering galacturonic acid from the seeds of plants of the species *brassica* which comprises: separating the vegetable oil from the seed; hydrolyzing the glucosides present in the oil-free seed by action of enzymes originally present in the seed; steam distilling the hydrolyzed mixture at a temperature between 90° and 100° C.; separating the liquids from the residue remaining after distillation; inoculating the separated liquids with a yeast culture of baker's yeast; fermenting the inoculated liquids; separating the liquids from the solids in the fermented mixture; and recovering the galacturonic acid from the separated liquid.

5. A process for recovering galacturonic acid from the seeds of plants of the family Cruciferae, which comprises: separating the vegetable oil from the seed; hydrolyzing the glucosides present in the oil-free seed by means of enzymes originally present in said seed by maintaining a mixture of said oil-free seed and between about 6 and 8 times its weight of water at temperatures between 40° and 55° C. for a time sufficient for said enzyme action to occur; steam distilling the hydrolyzed mixture; separating of the liquids from the residue remaining after distillation; inoculating the separated liquids with a yeast culture of baker's yeast; fermenting the inoculated liquids; separating the liquids from the solids in the fermented mixture; and recovering the galacturonic acid from the separated liquid.

6. A process for recovering galacturonic acid from mustard seeds which comprises: separating the vegetable oil from the seed; hydrolyzing the glucosides present in the oil-free seed by action of myrosin present originally in said seed; steam distilling of the hydrolyzed mixture at about 90 to 100° C.; separating the liquids from the residue remaining after distillation; inoculating the separated liquids with a yeast culture of baker's yeast; fermenting the inoculated liquids; separating the liquids from the solids in the fermented mixture; and recovering the galacturonic acid from the separated liquid.

7. In a process for treating Cruciferae seeds to recover valuable products therefrom which includes separating the vegetable oil from the seed; hydrolyzing the glucosides present in the oil-free seed; steam distilling the hydrolyzed mixture; and separately recovering the liquid remaining after distillation; the improved method of recovering galacturonic acid from said liquid which comprises: removing fermentable sugars and amino-acids from said liquid by innoculating the liquid with a yeast culture of baker's yeast and thereafter fermenting the yeast-containing mixture; separating the resulting product into a solid fraction and a liquid fraction, and recovering the free galacturonic acid from said separated liquid fraction.

8. In a process for treating seeds of the species brassica to recover valuable products therefrom which includes separating the vegetable oil from the seed; hydrolyzing the glucosides present in the oil-free seed by means of enzymes originally present in said seed; steam distilling the hydrolyzed mixture; and separately recovering of the liquid remaining after distillation; the improved method of recovering galacturonic acid from said liquid which comprises: removing fermentable sugars and amino-acids from said liquid by inoculating the liquid with a yeast culture of baker's yeast and thereafter fermenting the yeast-containing mixture; separating the resulting product into a solid fraction and a liquid fraction; evaporating the separated liquid to substantial degrees and recovering the free galacturonic acid as the solid resulting from said evaporation.

9. In a process for treating seeds of the family Cruciferae to recover valuable products therefrom which includes separating the vegetable oil from the seed; hydrolyzing the gluosides present in the oil-free seed; steam distilling the hydrolyzed mixture; and separately recovering the liquid remaining after distillation; the improved method of recovering galacturonic acid from said liquid which comprises: removing fermentable sugars and amino-acids from said liquid by inoculating the liquid with a yeast culture of baker's yeast and thereafter fermenting the yeast-containing mixture with aeration and agitation for about 6 hours; separating the resulting product into a solid fraction and a liquid fraction; and recovering the free galacturonic acid from said separated liquid fraction.

10. In a process for treating mustard seeds to recover valuable products therefrom which includes separating the vegetable oil from the seed; hydrolyzing the glucosides present in the oil-free seed; steam distilling the hydrolyzed mixture; and separately recovering the liquid remaining after distillation; the improved method of recovering galacturonic acid from said liquid which comprises: removing fermentable sugars and amino-acids from said liquid by inoculating the liquid with a yeast culture of baker's yeast and thereafter fermenting the yeast-containing mixture for between about 4 to 6 hours with aeration and agitation; separating the resulting product into a solid fraction and a liquid fraction, and recovering the free galacturonic acid from said separated liquid fraction.

11. In a process for treating seeds of Cruciferae to recover valuable products therefrom which includes separating the vegetable oil from the seed; hydrolyzing the glucosides present in the oil-free seed; steam distillation of the hydrolyzed mixture, and separately recovering the liquid remaining after distillation; the improved method of recovering galacturonic acid from said liquid which comprises: removing fermentable sugars and amino-acids from said liquid by inoculating the liquid with a yeast culture of baker's yeast and thereafter fermenting the yeast-containing mixture; controlling the fermentation by addition of a small amount of urea to said mixture to insure complete conversion of the sugars; removal of any excess urea by addition of urease to said fermented mixture; separating the resulting product into a solid fraction and a liquid fraction, and recovering the free galacturonic acid from said separated liquid fraction.

References Cited in the file of this patent
UNITED STATES PATENTS
2,338,534   Pasternack _____ Jan. 4, 1944

OTHER REFERENCES
Chemical Abstracts, 1957, page 10664e.